(12) United States Patent  
Kawaguchi et al.

(10) Patent No.: US 9,670,974 B2  
(45) Date of Patent: Jun. 6, 2017

(54) VEHICLE STARTUP CONTROL DEVICE AND STARTUP CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Takateru Kawaguchi, Susono (JP); Akito Suzuki, Tokyo (JP); Kenji Nakashima, Isehara (JP); Aki Hayakawa, Sagamihara (JP); Yasuhiro Endo, Isehara (JP); Hiroshi Sekiya, Atsugi (JP); Akihiro Tanabe, Atsugi (JP); Tetsuya Izumi, Ayase (JP); Masaaki Uchida, Yokosuka (JP)

(73) Assignees: JATCO Ltd, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 129 days.

(21) Appl. No.: 14/395,633

(22) PCT Filed: Apr. 19, 2013

(86) PCT No.: PCT/JP2013/061663  
§ 371 (c)(1),  
(2) Date: Oct. 20, 2014

(87) PCT Pub. No.: WO2013/161718  
PCT Pub. Date: Oct. 31, 2013

(65) Prior Publication Data  
US 2015/0134215 A1 May 14, 2015

(30) Foreign Application Priority Data

Apr. 23, 2012 (JP) ................. 2012-097799

(51) Int. Cl.  
*F16D 48/06* (2006.01)  
*F16D 48/08* (2006.01)  
(Continued)

(52) U.S. Cl.  
CPC ......... *F16D 48/066* (2013.01); *B60W 10/026* (2013.01); *F16D 48/08* (2013.01);  
(Continued)

(58) Field of Classification Search  
CPC .. F16D 48/066; F16D 48/08; F16H 2059/385; F16H 2061/145; F16H 61/143;  
(Continued)

(56) References Cited

U.S. PATENT DOCUMENTS 5,085,301 A * 2/1992 Imamura ............... F16H 61/143  
192/3.31  
6,039,675 A 3/2000 Adachi et al.  
(Continued)

FOREIGN PATENT DOCUMENTS

JP 04-203561 A 7/1992  
JP 10-110818 A 4/1998  
(Continued)

*Primary Examiner* — Jacob S Scott  
(74) *Attorney, Agent, or Firm* — Foley & Lardner LLP

(57) ABSTRACT

A device for controlling a start of a vehicle includes a rotation speed obtaining unit that obtains an actual engine rotation speed of the engine, a target rotation speed computing unit that computes a target rotation speed of the engine in the slip control, a control target value computing unit that computes a control target value, which is a target value for controlling the engine rotation speed to the target rotation speed based on the actual engine rotation speed and the target rotation speed, and an instruction value computing unit that computes an instruction value for the lock-up clutch necessary to control the engine rotation speed to the control target value based on the control target value.

8 Claims, 9 Drawing Sheets

(51) Int. Cl.
  *F16H 61/14* (2006.01)
  *B60W 10/02* (2006.01)
  *F16H 59/38* (2006.01)

(52) U.S. Cl.
  CPC ... *F16H 61/143* (2013.01); *F16D 2500/3067* (2013.01); *F16D 2500/3101* (2013.01); *F16D 2500/3144* (2013.01); *F16D 2500/3166* (2013.01); *F16D 2500/50227* (2013.01); *F16D 2500/70404* (2013.01); *F16D 2500/70406* (2013.01); *F16D 2500/70426* (2013.01); *F16H 2059/385* (2013.01); *F16H 2061/145* (2013.01); *F16H 2312/02* (2013.01)

(58) Field of Classification Search
  CPC  F16H 2312/02; B60W 10/023; B60W 10/026
  See application file for complete search history.

(56) References Cited

U.S. PATENT DOCUMENTS

| | | |
|---|---|---|
| 8,210,988 B2 | 7/2012 | Iraha |
| 2004/0082434 A1* | 4/2004 | Segawa ................. F16H 61/143 477/62 |
| 2004/0162184 A1* | 8/2004 | Segawa ................. F16H 61/143 477/62 |
| 2005/0278103 A1* | 12/2005 | Higashimata ......... F16H 61/143 701/67 |
| 2006/0089776 A1* | 4/2006 | Segawa ................. F16H 61/143 701/67 |
| 2009/0247363 A1* | 10/2009 | Nagami ................ F16D 48/066 477/181 |
| 2010/0204011 A1 | 8/2010 | Iraha |
| 2011/0136622 A1* | 6/2011 | Enoki .................. B60W 10/02 477/83 |
| 2011/0196590 A1 | 8/2011 | Ayabe et al. |

FOREIGN PATENT DOCUMENTS

| | | |
|---|---|---|
| JP | 11-094067 A | 4/1999 |
| JP | 2000-145950 A | 5/2000 |
| JP | 2006-046636 A | 2/2006 |
| JP | 2010-164092 A | 7/2010 |
| JP | 2011-122619 A | 6/2011 |
| JP | 2011-163398 A | 8/2011 |

* cited by examiner

VEHICLE STARTUP CONTROL DEVICE AND STARTUP CONTROL METHOD

TECHNICAL FIELD

The present invention relates to a vehicle startup control device.

BACKGROUND ART

In a vehicle provided with a torque converter having a lock-up clutch, there is known a so-called start slip control, in which a torque transmission efficiency is improved by performing a slip control for the lock-up clutch during a vehicle start in order to improve fuel efficiency.

During the start slip control, just by performing a feedback control based on a proportional/integral control in an instruction pressure control of the lock-up clutch of the torque converter, a deviation from a target slippage disadvantageously increases when a slippage increases in response to a change of the engine torque during acceleration/deceleration.

For this problem, in JP 4-203561A, JP 2006-46636A, and JP 2011-122619 A, a technique has been discussed, in which the instruction pressure of the lock-up clutch is controlled based on a lock-up differential pressure value subjected to a feedforward control and a feedback control value obtained from the engine torque signal estimated from an engine operation state as well as the feedback control value.

SUMMARY OF INVENTION

The start slip control is executed when a vehicle starts, that is, while the engine torque is low, and the input rotation speed of the lock-up clutch is low. For this reason, during the start slip control, robustness of the start slip control may be easily degraded due to a variation of the engine rotation speed during the start slip control.

In the technique discussed in JP 4-203561 A, JP 2006-46636 A, and JP 2011-122619 A, a control value is stabilized using the feedforward control value and the feedback control value. In this case, in the engine torque signal used in the computation, it is conceived that an actual engine torque is generated when the engine rotation speed is changed actually, and a delay of the computation timing of the engine torque signal or an error in the engine torque signal itself may be generated, an error may occur in computation of the lock-up differential pressure during the computation of the feedforward element.

If the computation is performed using a value having such an error, a capacity of the lock-up clutch becomes excessive or short repeatedly due to a difference between the engine torque signal and the actual engine torque, so that an engagement control of the lock-up clutch suffers from hunting. This disadvantageously generates a shock or a torque fluctuation in a driving system and generates a driver's uncomfortable feeling.

It is therefore an object of this disclosure to provide a vehicle start control device capable of preventing a driver's uncomfortable feeling of a vehicle in which a slip control is performed for a lock-up clutch during a vehicle start.

One aspect of the present invention is applied to a device for controlling a start of a vehicle in which an output of an engine is output from a transmission via a torque converter having a lock-up clutch, including: a hydraulic pressure control circuit that controls a torque transmittable by the lock-up clutch by controlling an engagement force of the lock-up clutch; and a control unit that controls the hydraulic pressure control circuit to perform a slip control for the lock-up clutch during a vehicle start, wherein the control unit has a rotation speed obtaining unit that obtains an engine rotation speed of the engine at a current timing, a target rotation speed computing unit that computes a target rotation speed of the engine in the slip control at a current timing, a control target value computing unit that computes a control target value, which is a target value necessary in an immediately following control cycle, to control the engine rotation speed to the target rotation speed based on the engine rotation speed and the target rotation speed, and an instruction value computing unit that computes an instruction value for an engagement force of the lock-up clutch necessary to control the engine rotation speed to the control target value in the immediately following control cycle.

Another aspect of the present invention is a method for controlling a start of a vehicle in which an output of an engine is output from a transmission through a torque converter having a lock-up clutch, including: a first process of obtaining an engine rotation speed of the engine at a current timing; a second process of computing a target rotation speed of the engine at a current timing when a slip control is performed for the torque converter; a third process of computing a control target value, which is a target value necessary in an immediately following control cycle, to control the engine rotation speed to the target rotation speed based on the engine rotation speed and the target rotation speed; a fourth process of computing an instruction value to the lock-up clutch necessary to control the engine rotation speed to the control target value of an immediately following control cycle based on the control target value; a fifth process of controlling a torque transmittable by the lock-up clutch by controlling an engagement force of the lock-up clutch based on the instruction torque; and a sixth process of repeating the first to fifth processes.

According to above aspects, in a slip control of the lock-up clutch during a vehicle start, when the accelerator pedal opening or the throttle valve opening is equal to or lower than a predetermined value, the control target value is computed based on the engine rotation speed and the target rotation speed, and the engagement force of the lock-up clutch is controlled based on this control target value. In this manner, the engine rotation speed is controlled by performing the slip control for the lock-up clutch based on the engine rotation speed without using an engine torque signal output from the engine. As a result, it is possible to prevent hunting caused by a failure to converge to a control value due to a delay or error in a signal, for example, when a feedforward control or a feedback control is performed using the engine torque signal. Therefore, it is possible to prevent a driver's uncomfortable feeling.

An embodiment and advantages of the present invention will be described below in detail with reference to the attached drawings.

DESCRIPTION OF EMBODIMENTS

Figure 1:
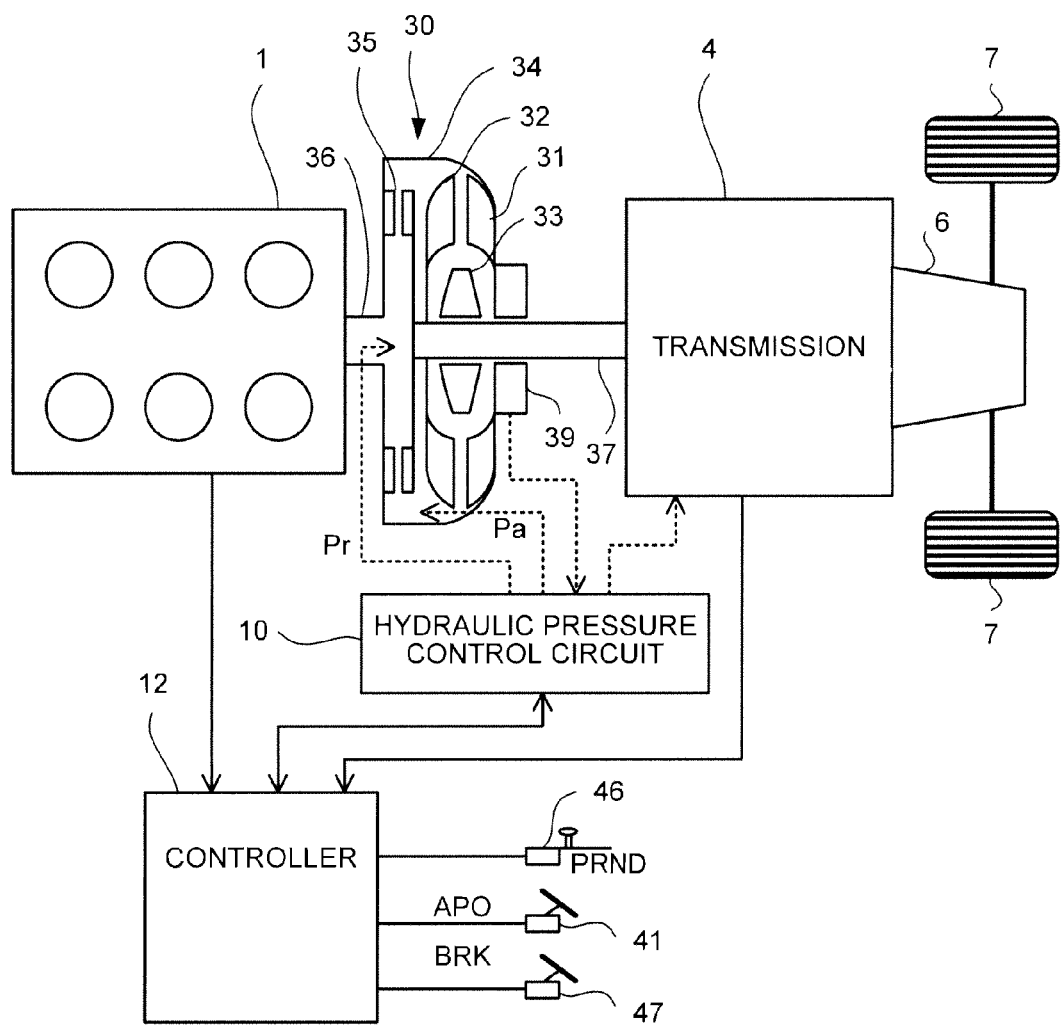
FIG. 1 is an explanatory diagram illustrating a driving device and a control device according to an embodiment of this disclosure.

FIG. 1 is an explanatory diagram showing a driving device and a control device for pertaining to a device for controlling a start of a vehicle according to an embodiment of the present invention.

An engine 1 is mounted on the vehicle. The output of the engine 1 is output from crankshaft 36 and input to a torque converter 30 coupled to the crankshaft 36. The torque converter 30 includes a lock-up clutch 35. The output of the torque converter 30 is input to a transmission 4 via a transmission input shaft 37. The output of the transmission 4 rotates a drive wheel 7 via a final speed reduction gear 6.

The vehicle includes a hydraulic pressure control circuit 10 that controls operations of the torque converter 30 and the transmission 4 by controlling a hydraulic pressure supplied thereto. The vehicle is provided with a controller 12 that controls the operations of the hydraulic pressure control circuit 10 and the transmission 4.

An accelerator opening sensor 41 that detects an amount of operation on an accelerator pedal (accelerator pedal opening) APO from a driver, a brake switch 47 that detects an amount of operation on a brake pedal (brake pedal depression level) BRK, and an inhibitor switch 46 that detects a state of operation on a shift lever by a driver are connected to the controller 12.

The controller 12 receives signals from the engine 1, such as a throttle valve opening TVO, an engine rotation speed Ne, an engine torque Trq, and the like.

In addition, the controller 12 receives a transmission input rotation speed Ni and a transmission output rotation speed No from the transmission 4. It is noted that a vehicle speed VSP may be output instead of the transmission output rotation speed No.

The controller 12 determines a target gear ratio of the transmission 4 based on the detection values such as the accelerator pedal opening APO and the vehicle speed VSP, and outputs an instruction to the hydraulic pressure control circuit 10 based on a result of the determination such that the actual gear ratio of the transmission 4 becomes the target gear ratio. The transmission 4 may be either a stepped variable transmission or a continuously variable transmission.

The controller 12 determines an engagement state of the lock-up clutch 35 of the torque converter 30 and outputs an instruction for controlling the engagement state of the lock-up clutch 35 to the hydraulic pressure control circuit 10 based on a result of the determination.

The torque converter 30 includes a pump impeller 31 as an input element, a turbine runner 32 as an output element, and a stator 33 as a reaction force element.

The pump impeller 31 is driven by a rotational force from the engine 1 via a torque converter cover 34. The turbine runner 32 is provided in a converter chamber formed by the pump impeller 31 and the torque converter cover 34 and is arranged to oppose the pump impeller 31. The stator 33 is interposed between an inner periphery of the pump impeller 31 and an inner periphery of the turbine runner 32.

In the torque converter 30, the pump impeller 31 rotated by the engine 1 agitates a working fluid, the turbine runner 32 is driven by a reactive force of the stator 33 while increasing torque, and the output from the turbine runner 32 is transmitted to the transmission 4 via the transmission input shaft 37.

When a torque increase and absorption of a torque fluctuation are unnecessary, the torque converter 30 directly couples the pump impeller 31 and the turbine runner 32 to each other mechanically by placing the lock-up clutch 35 in an engaged state.

An oil pump 39 is provided between the torque converter 30 and the transmission 4. The oil pump 39 is rotated by a driving force of the engine 1 to generate a hydraulic pressure. The generated hydraulic pressure is supplied to the hydraulic pressure control circuit 10.

The hydraulic pressure control circuit 10 controls each of an applied pressure Pa supplied to a converter chamber side and a release pressure Pr supplied to a lock-up clutch side. An engagement force of the lock-up clutch 35 is controlled using a differential pressure (Pa−Pr) between the applied pressure and the release pressure.

Figure 2:
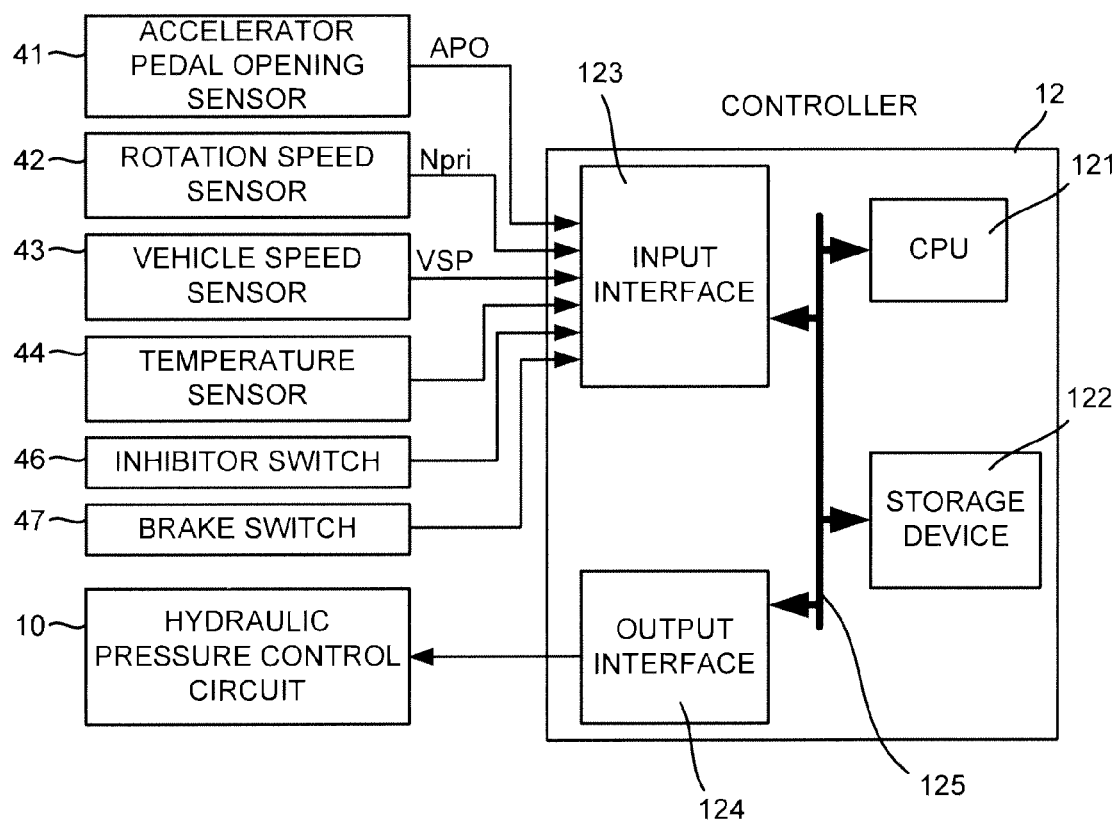
FIG. 2 is a functional block diagram illustrating a controller according to an embodiment of this disclosure.

FIG. 2 is a functional block diagram in the focusing on the controller 12.

As shown in FIG. 2, the controller 12 includes a CPU 121, a storage device 122 such as a RAM and a ROM, an input interface 123, an output interface 124, and a bus 125 for connecting these components each other.

The input interface 123 receives an output signal of the accelerator opening sensor 41 obtained by detecting an opening of the accelerator pedal (hereinafter, referred to as a "accelerator pedal opening APO"), an output signal from the transmission 4 (such as the transmission input rotation speed Ni, the transmission output rotation speed No, and the vehicle speed VSP), an input signal from the brake switch 47 obtained by detecting depression of the brake pedal and a fluid pressure of the brake fluid, an output signal of the inhibitor switch 46 obtained by detecting a position of the selector lever, and the like.

The storage device 122 stores a speed conversion control program of the transmission 4 and a speed conversion map used in the speed conversion control program. The CPU 121 reads and executes the speed conversion control program stored in the storage device 122 to perform various computations for various signals input through the input interface 123 to generate an instruction signal and outputs the generated instruction signal to the hydraulic pressure control circuit 10 through the output interface 124. Various values used in the computation of the CPU 121 and computation results thereof are appropriately stored in the storage device 122.

The hydraulic pressure control circuit 10 includes a plurality of flow channels and a plurality of hydraulic pressure control valves. The hydraulic pressure control circuit 10 controls a plurality of hydraulic pressure control valves based on the instruction signal from the controller 12 to switch a supply path of the hydraulic pressure, generate a necessary hydraulic pressure from the hydraulic pressure generated from the oil pump 39, and supply the hydraulic pressure to each part of the transmission 4 and the torque converter 30. As a result, the transmission 4 performs a speed conversion operation.

The hydraulic pressure control circuit 10 controls a torque capacity of the lock-up clutch 35 based on the instruction from the controller 12.

Specifically, when the applied pressure Pa is lower than the release pressure Pr (Pa<Pr), the lock-up clutch 35 is not engaged, that is to say, the torque converter 30 is in a converter state. When the applied pressure Pa is higher than the release pressure Pr (Pa>Pr), the engagement force of the lock-up clutch 35 increases depending on the differential pressure (Pa−Pr), so that the engagement force of the lock-up clutch 35 is maximized at a predetermined differential pressure. The engagement force of the lock-up clutch 35 generates a torque capacity which is a torque transmittable by the lock-up clutch 35.

It is noted that, when the differential pressure is equal to or lower than a predetermined value, the lock-up clutch 35 is in a slip engagement state (or slip lock-up state), in which a differential rotation is generated between the input rotation speed (equal to the engine rotation speed Ne) and the output rotation speed (equal to the transmission input rotation speed Ni) of the torque converter 30.

Next, a description will be made for operations of a vehicle having such a configuration during the start.

In a vehicle according to an embodiment of this disclosure, the lock-up clutch 35 of the torque converter 30 is controlled into a slip engagement state when the vehicle stops and then starts to drive.

By controlling the lock-up clutch 35 into the slip engagement state during the start operation, the torque of the engine 1 is transmitted to the torque converter 30 and through the lock-up clutch 35 simultaneously. In this way, torque transmission efficiency of the engine 1 is improved, and a rise of the rotation speed of the engine 1 is suppressed, so that it is possible to improve fuel efficiency.

In the related art, a control in a slip engagement state during a vehicle start is typically performed such that a slippage is determined based on the vehicle speed, the engine torque, and the like, and the engagement force of the lock-up clutch 35 is controlled to match this slippage.

Specifically, a transmission torque of the lock-up clutch 35 is computed based on an engine torque signal and a target slippage of the lock-up clutch 35, and a lock-up differential pressure corresponding to this transmission torque is instructed to the hydraulic pressure control circuit 10. In this case, the engine torque signal is computed by an engine controller or the like using a map based on the engine rotation speed Ne, the accelerator pedal opening APO, or the like.

For this reason, the engine torque signal may be delayed or deviated from the actual engine torque. In order to address such a delay or deviation, a feedforward control or a feedback control based on an actual torque capacity or an actual differential pressure of the lock-up clutch 35 was performed in the related art.

The slip control during the vehicle start is performed when the vehicle speed VSP, the engine rotation speed Ne, and the like are low. Therefore, due to such a delay or deviation of the control described above, a variation of the actual differential pressure of the lock-up clutch 35 is easily generated. Due to this variation, the lock-up differential pressure increases, and the torque capacity excessively increases, so that the engine rotation speed or the lock-up differential pressure may drop to generate a shortage of the torque capacity. For this reason, the control may be performed such that the engine rotation speed surges up or down repeatedly to generate hunting. In order to prevent hunting, if the control is performed to delay the slip control initiation timing, the torque capacity of the lock-up clutch 35 does not increase from the vehicle start, so that a fuel efficiency improvement advantage is eliminated.

In order to address such a problem, according to an embodiment of this disclosure, a slip control of the lock-up clutch 35 is performed during the vehicle start as described below without using the engine torque signal that generates instable control.

Figure 3:
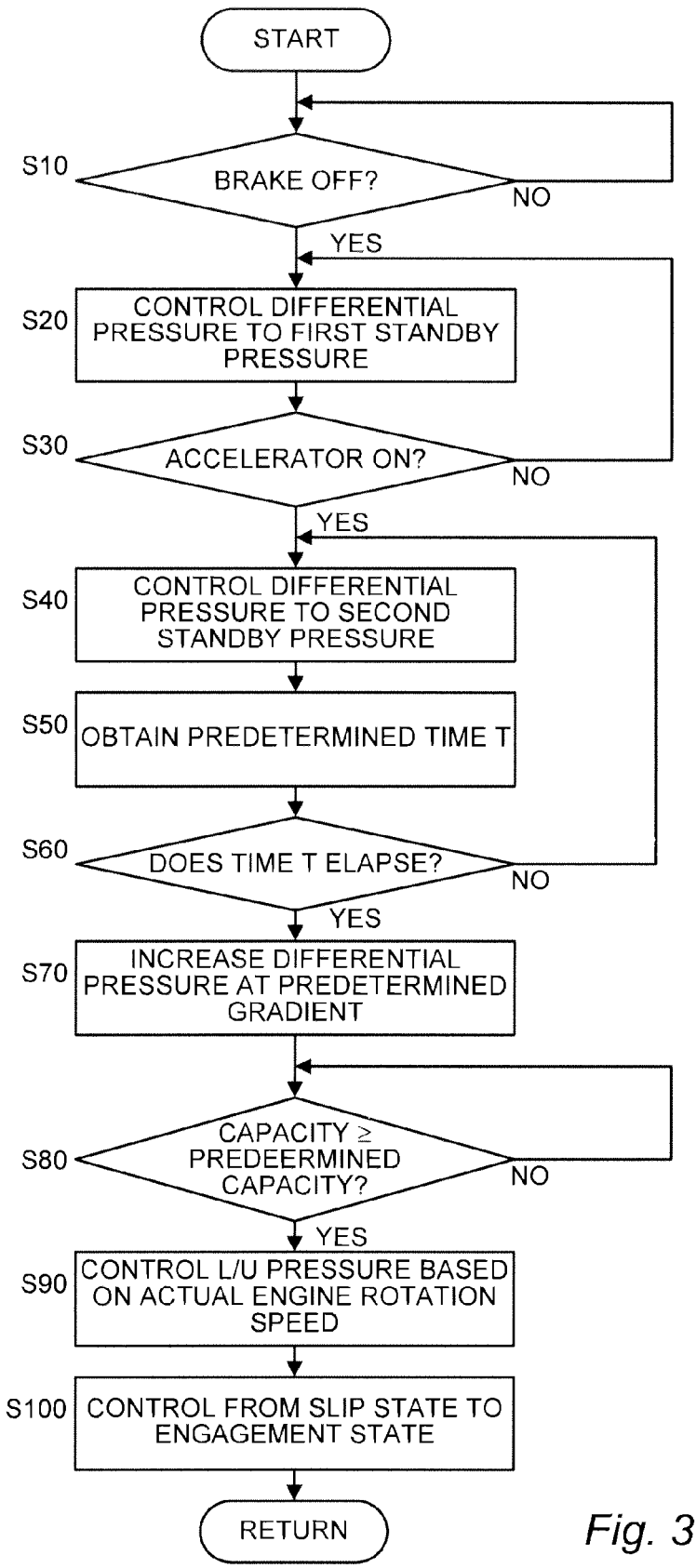
FIG. 3 is a flowchart illustrating a vehicle start control according to an embodiment of this disclosure.

FIG. 3 is a flowchart illustrating a vehicle start control performed by the controller 12 according to an embodiment of this disclosure.

When a vehicle stop state is detected, the flowchart of FIG. 3 is executed by the controller 12 in parallel with other processes performed by the controller 12.

First, the controller 12 determines whether or not a driver releases the depression of the brake pedal (whether or not a driver releases a foot from the brake pedal) based on the signal from the brake switch 47 in step S10. When the brake pedal is depressed, step S10 is repeated, and the process has a standby state. In embodiments of this disclosure, a period after the brake pedal is released until the accelerator pedal is depressed will be referred to as a "first phase."

When it is determined that the brake pedal is not depressed, the process advances to step S20, so that the controller 12 outputs an instruction to the hydraulic pressure control circuit 10 to make the differential pressure of the lock-up clutch 35 (Pa−Pr) equal to the first standby pressure. The hydraulic pressure control circuit 10 receives this instruction and controls the hydraulic pressure supplied to the lock-up clutch 35 such that the differential pressure is equal to the first standby pressure.

The first standby pressure refers to a state for preparing engagement of the lock-up clutch 35 while the lock-up clutch 35 does not have the torque capacity. For example, as a control for setting the release pressure Pr slightly lower than the applied pressure Pa, the differential pressure is controlled such that frictional facings of the lock-up clutch 35 do not make contact with each other, and the torque capacity is not generated.

Then, the controller 12 determines whether or not a driver depresses the accelerator pedal, and the accelerator operation is turned on from the off-state based on the signal input to the accelerator opening sensor 41 in step S40.

When the accelerator pedal is not depressed, the process returns to step S20, and the lock-up clutch 35 is maintained in the standby pressure.

When it is determined that the accelerator pedal is depressed, the process advances to step S40, so that the controller 12 sets a second standby pressure which is higher than the first standby pressure set in step S30.

The second standby pressure is a differential pressure by which the lock-up clutch 35 can be controlled to a state before the lock-up clutch 35 has the torque capacity even when the engine rotation speed Ne and a line pressure increase as the accelerator pedal opening APO increases. By controlling the lock-up clutch 35 to the state before the lock-up clutch 35 has the torque capacity, it is possible to reduce the time until the lock-up clutch 35 has the torque capacity in the third phase.

The maximum value of the second standby pressure is set to a maximum differential pressure at which the lock-up clutch 35 does not have a torque capacity even by a difference between the instructed differential pressure and the actual differential pressure while the accelerator operation is turned on, the oil pump 39 is driven, and the line pressure of the hydraulic pressure control circuit 10 increases. By setting the second standby pressure in this manner, it is possible to perform the control such that the lock-up clutch 35 does not have the torque capacity even when the line pressure increases. Therefore, the engine rotation speed Ne does not drop during the second phase.

Therefore, it is possible to increase the second standby pressure over the first standby pressure by using this maximum value as an upper limit. Since preparation is performed by increasing the second standby pressure, it is possible to reduce time until the lock-up clutch 35 has the torque capacity in the subsequent third phase.

Then, the process of the controller 12 advances to step S50 in which a predetermined time T is obtained by reference to a time setting map. Then, the process advances to step S60 to determine whether or not the obtained predetermined time T elapses.

If the predetermined time T does not elapse, the process returns to step S40, and the controller 12 maintains the differential pressure of the lock-up clutch 35 set in step S40. In embodiments of this disclosure, a period until the predetermined time T elapses after depression of the accelerator pedal is detected, and a start request is issued will be referred to as a "second phase."

When it is determined that the predetermined time T elapses, the process advances to step S70, so that the controller 12 increases the differential pressure of the lock-up clutch 35 (Pa−Pr) at a predetermined gradient C determined based on the accelerator pedal opening APO to control the lock-up clutch 35 into the engagement side.

Then, the controller 12 determines whether or not the torque capacity of the lock-up clutch 35 is equal to or higher than a predetermined capacity, and rotation of the engine 1 starts to be transmitted by the lock-up clutch 35 in step S80. If it is determined that the torque capacity is equal to or higher than the predetermined capacity, the process advances to step S90. Otherwise, the process repeats step S80 and stands by. A period until the lock-up clutch 35 has the torque capacity in determination of step S80 after the predetermined time T elapses in step S60 will be referred to as a "third phase."

In step S80, the determination is not necessarily performed based on the torque capacity. For example, it may be determined that the torque capacity is equal to or higher than a predetermined capacity when the engine rotation speed Ne changes from an increasing tendency to a decreasing tendency. Alternatively, the process may advance to step S90 if a predetermined time elapses after the process advances to the third phase.

In step S90, the controller 12 controls the torque capacity of the lock-up clutch 35 based on the engine rotation speed Ne. Specifically, in a driving area where the vehicle speed VSP and the engine rotation speed Ne are relatively low after a vehicle starts, the torque capacity of the lock-up clutch 35 is controlled using the method described in FIG. 5 and subsequent drawings such that the lock-up clutch 35 can exert a suitable torque capacity, by which the engine torque does not drop, and the rotation of the engine 1 can be transferred to a driving force after the lock-up clutch 35 starts to have the torque capacity. A period of controlling the torque capacity of the lock-up clutch 35 in step S90 will be referred to as a fourth stage.

After the lock-up clutch 35 is controlled in step S90, the process advances to step S100. In step S100, the instructed differential value of the lock-up clutch 35 is increased at a predetermined gradient D such that the lock-up clutch 35 changes from the slip lock-up state to the lock-up state. Through the control of step S100, the lock-up clutch 35 has the engagement state. A period of control until the lock-up clutch 35 has the engagement state in step S100 will be referred to as a "fifth phase."

Through such a control, it is possible to control the engagement force of the lock-up clutch 35 during a vehicle start.

Figure 4:
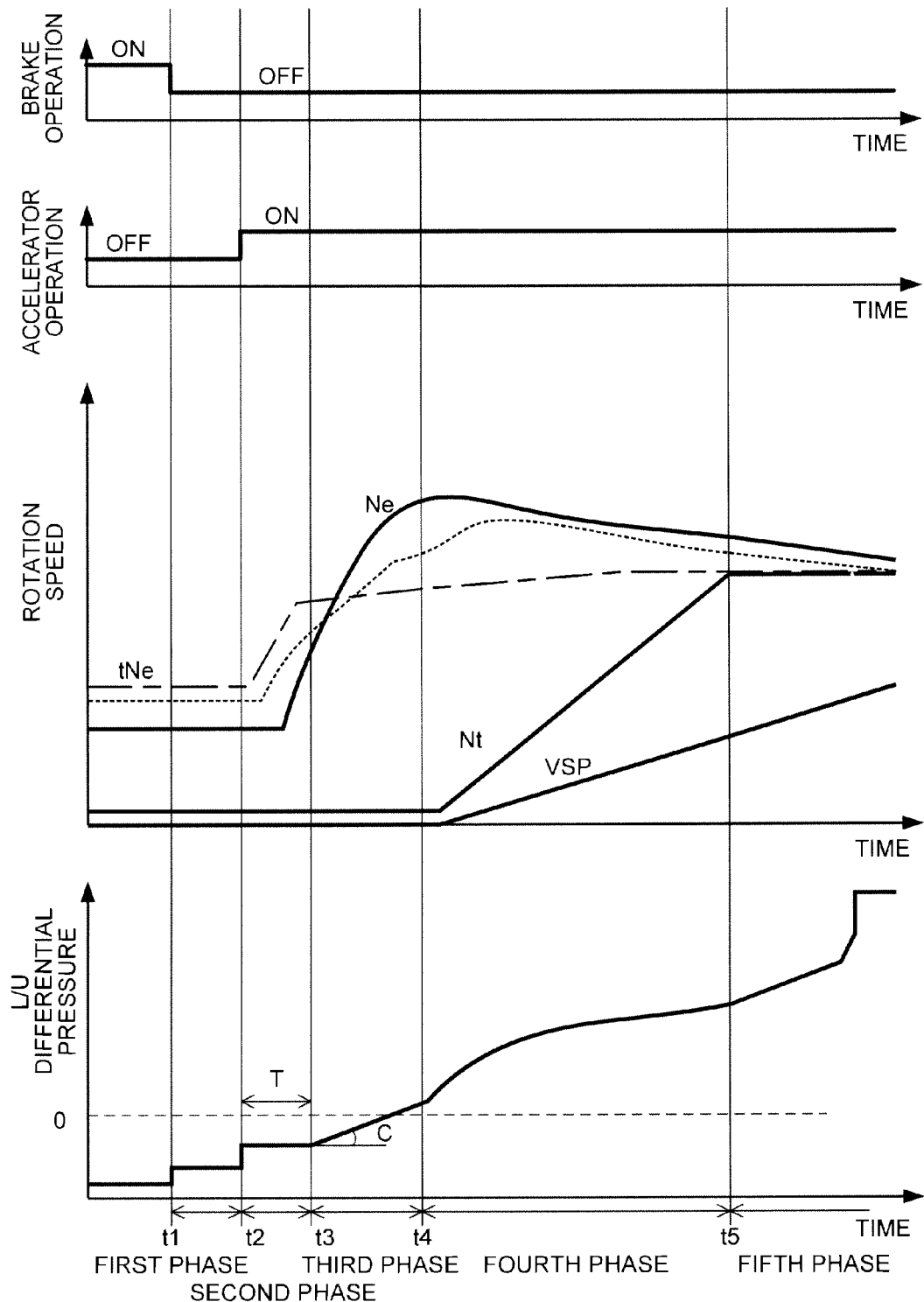
FIG. 4 is an explanatory diagram illustrating a vehicle start control according to an embodiment of this disclosure.

FIG. 4 is an explanatory diagram illustrating a start control of a vehicle according to an embodiment of this disclosure.

FIG. 4 illustrates an operation state of the brake pedal, an operation state of the accelerator pedal, rotation speeds of the engine 1 and the torque converter 30, and a differential pressure (instruction pressure) state of the lock-up clutch 35.

While a vehicle stops, a driver depresses the brake pedal (the braking operation is turned on). Then, at the timing t1, when a driver releases the depression of the brake pedal (the braking operation is turned off), the controller 12 determines that a vehicle start is intended. The brake pedal may be manually operated (using a lever or switch).

In this case, the controller 12 determines YES in step S10 of FIG. 3, the controller 12 controls the differential pressure of the lock-up clutch 35 to the standby pressure in step S20 (first phase).

Then, at the timing t2, when a driver depresses the accelerator pedal (the accelerator operation is turned on), it is determined that vehicle acceleration is intended.

In this case, the controller 12 determines YES in step S30 of FIG. 3, and the controller 12 controls the lock-up clutch 35 to the second standby pressure higher than the first standby pressure through the process of step S40. The control using the second standby pressure is performed until the predetermined time T elapses (second phase).

The predetermined time T is set using a time setting map based on the accelerator pedal opening APO and the accelerator opening rate ΔAPO at the timing t2, that is, when a driver operates the accelerator pedal. The time setting map is set such that the predetermined time T increases as the accelerator pedal opening APO increases, and as a change rate of the accelerator opening rate ΔAPO increases.

The time setting map may be obtained based on an engine torque Trq and an engine torque change rate ΔTrq obtained from the engine 1 at the timing t2 instead of the accelerator pedal opening. This time setting map is set such that the predetermined time T increases as the engine torque Trq increases, and as the engine torque change rate ΔTrq increases.

When the predetermined time T elapses, at the timing t3, it is determined YES in step S60 of FIG. 3, and the controller 12 performs control in step S70 such that the differential pressure of the lock-up clutch 35 increases at a predetermined gradient C based on the accelerator pedal opening APO until the lock-up clutch 35 is engaged (third phase).

The predetermined gradient C is set by the controller 12 such that a ratio between a torque of the engine 1 and a level of the torque drop when the lock-up clutch 35 has the torque capacity becomes approximately constant based on the accelerator pedal opening APO.

In the third phase, the controller 12 determines whether or not the lock-up clutch 35 starts having the torque capacity. At the timing t4, if it is determined that the lock-up clutch 35 starts having the torque capacity, it is determined YES in step S80 of FIG. 3, and the process advances to the fourth phase. In the fourth phase, the torque capacity of the lock-up clutch 35 is controlled based on the engine rotation speed Ne as described below.

Then, at the timing t5, the control of the fourth phase is terminated, and the lock-up clutch 35 is controlled to the engagement state in the fifth phase. Through this control, the control is gradually performed until the differential pressure of the lock-up clutch 35 is maximized, so that the lock-up clutch 35 is set to the engagement state.

Next, a description will be made for the control of the torque capacity of the lock-up clutch 35 in the fourth phase.

Figure 5:
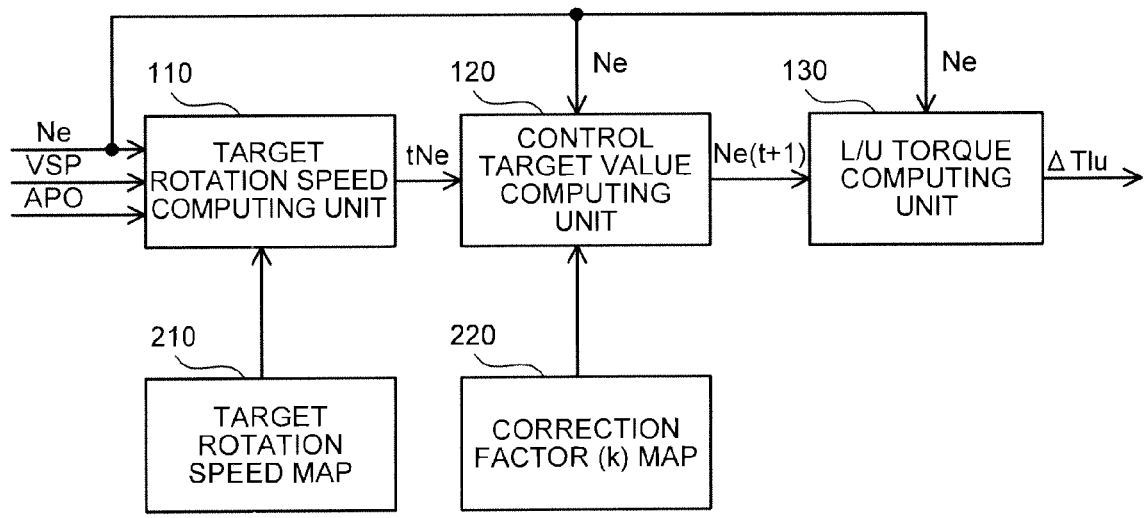
FIG. 5 is a functional block diagram illustrating components relating to a control of a lock-up clutch according to an embodiment of this disclosure.

FIG. 5 is a functional block diagram illustrating portions of the controller 12 relating to the control of the torque capacity of the lock-up clutch 35 according to an embodiment of this disclosure.

The controller 12 includes a target rotation speed computing unit 110, a control target value computing unit 120, and an L/U torque computing unit 130.

The target rotation speed computing unit 110 computes the target rotation speed tNe at the corresponding timing by referencing a target rotation speed map 210 based on the received engine rotation speed Ne, the received vehicle speed VSP, and the received accelerator pedal opening APO. The target rotation speed tNe is an optimal target value of the engine rotation speed at the corresponding timing during the start slip control. That is, the target rotation speed tNe is a target value for controlling the slippage of the lock-up clutch 35 corresponding to the differential rotation (Ne−tNe) for the engine rotation speed Ne at the corresponding timing.

The control target value computing unit 120 computes the control target value Ne(t+1) by referencing a correction factor map 220 based on the engine rotation speed Ne and the target rotation speed tNe computed by the target rotation speed computing unit 110. The control target value Ne(t+1) is a target value of the engine rotation speed Ne immediately following a control cycle for the engine rotation speed Ne at the corresponding timing.

The L/U torque computing unit 130 computes a torque change amount ΔTlu of the lock-up clutch 35 based on the control target value Ne(t+1) computed by the control target value computing unit 120.

The controller 12 controls the torque capacity of the lock-up clutch 35 by instructing the hydraulic pressure control circuit 10 to change the torque capacity of the lock-up clutch 35 by the computed torque change amount ΔTlu.

Figure 6:
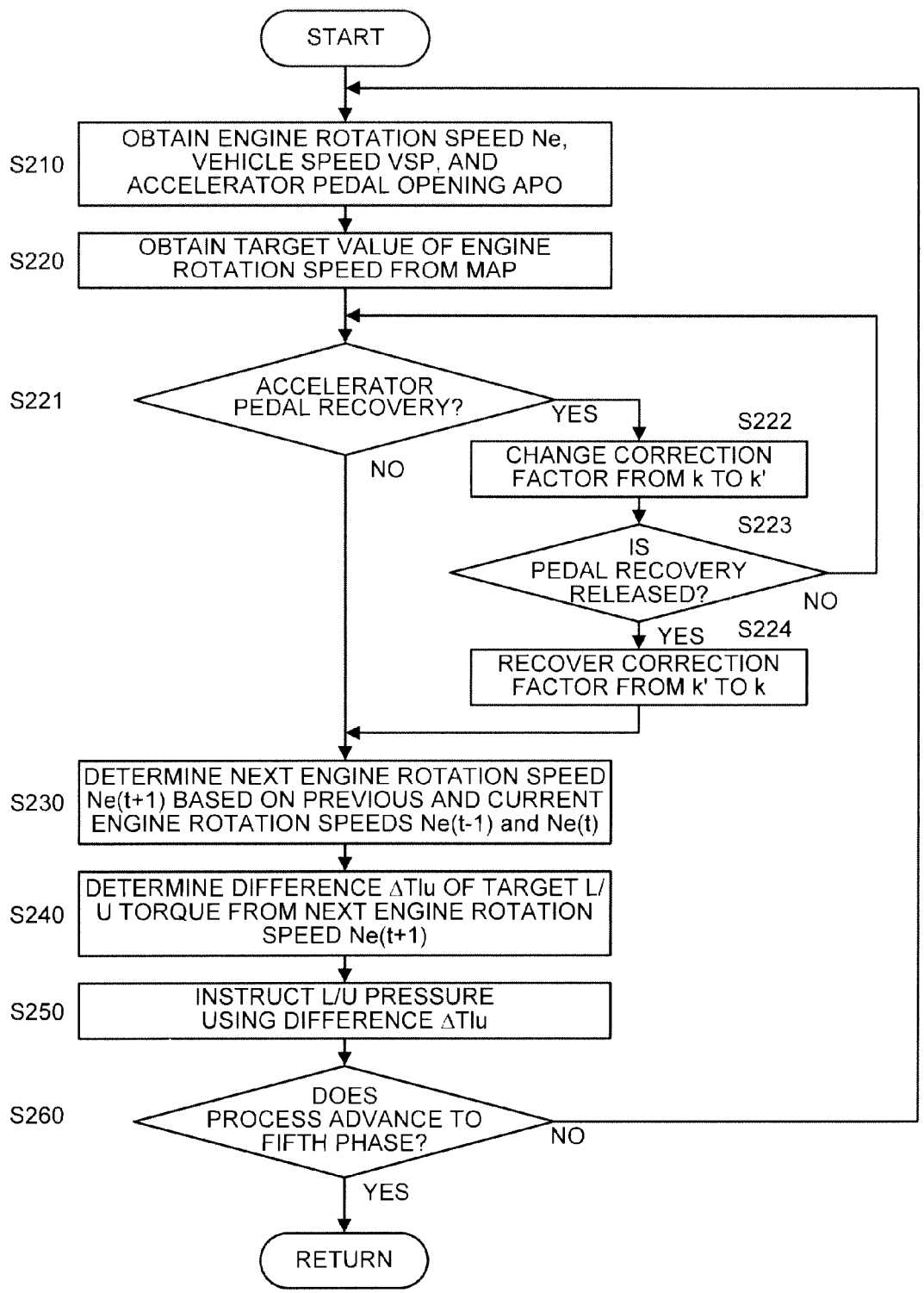
FIG. 6 is a flowchart illustrating a control of the lock-up clutch of the vehicle start control according to an embodiment of this disclosure.

FIG. 6 is a flowchart illustrating a vehicle start control performed by the controller 12 according to an embodiment of this disclosure, and specifically, a flowchart illustrating a control of the lock-up clutch 35 in step S80 of FIG. 3.

First, the controller 12 obtains the engine rotation speed Ne, the vehicle speed VSP, and the accelerator pedal opening APO in step S210.

It is noted that, When the accelerator pedal opening APO at this time is equal to or higher than a predetermined value, the start slip control is not performed. Therefore, the process advances to step S220 only when the accelerator pedal opening APO is equal to or lower than a predetermined value.

Then, the target rotation speed computing unit 110 of the controller 12 computes the target rotation speed tNe for the current engine rotation speed Ne by referencing a target rotation speed map 210 based on the vehicle speed VSP and the accelerator pedal opening APO in step S220.

Then, the control target value computing unit 120 of the controller 12 first determines whether or not the pedal recovery of the accelerator pedal is performed in step S221.

Specifically, the controller 12 determines whether or not the change rate ΔAPO of the accelerator pedal opening APO is reduced by a predetermined value or larger. When the accelerator pedal is not released, the process advances to step S230.

When the controller 12 determines that the pedal recovery of the accelerator pedal is performed, the process advances to step S222, so that the control target value computing unit 120 sets a pedal recovery correction factor k' only based on the engine rotation speed Ne without using the correction factor k for computing the control target value Ne(t+1) as an intermediate target value such that the engine rotation speed Ne used in the next step S230 becomes the target rotation speed tNe in order to compute a pedal recovery control target value Ne(t+1)' as an intermediate target value from the target rotation speed tNe. Note that the correction factor k will be described below in detail.

More specifically, as the accelerator pedal opening APO decreases, the value of the target rotation speed tNe changes based on the target rotation speed map 210. As a result, the target rotation speed tNe decreases as the accelerator pedal opening APO decreases. However, since the engine rotation speed Ne and the vehicle speed VSP do not abruptly change even when the accelerator pedal opening APO decreases as the accelerator pedal is released, the difference between the engine rotation speed Ne and the new target rotation speed tNe increases as the accelerator pedal opening APO decreases. Meanwhile, the control target value Ne(t+1) abruptly decreases to follow the target rotation speed tNe when the correction factor k does not change computationally even when the accelerator pedal is released.

As the control target value Ne(t+1) abruptly decreases to follow the target rotation speed tNe, the differential pressure of the lock-up clutch 35 increases such that the engine rotation speed Ne follows the control target value Ne(t+1). As a result, the engine rotation speed Ne drops, and a driver may have an uncomfortable feeling.

In order to prevent such a problem, the pedal recovery control target value Ne(t+1)' is computed by setting the pedal recovery correction factor k' such that a difference between the control target value Ne(t+1) and the engine rotation speed Ne is eliminated without setting the correction factor k, which will be described below, using the correction factor map 220 when the accelerator pedal opening APO is returned.

By computing the pedal recovery control target value Ne(t+1)' based on the pedal recovery correction factor k', it is possible to prevent a drop of the engine rotation speed Ne even when the accelerator pedal opening APO is recovered.

Then, the process advances to step S223, so that the control target value computing unit 120 determines whether or not the pedal recovery of the accelerator pedal is released. In step S223, specifically, it is determined that the pedal recovery is released when a state that the change rate ΔAPO of the accelerator pedal opening APO is lower than a predetermined value is continued for a predetermined time or longer while the accelerator pedal opening APO is equal to or higher than a predetermined opening.

when the controller 12 determines that the pedal recovery is released, the process advances to step S224, so that the control target value computing unit 120 changes the correction factor k used in the next step S230 from the pedal recovery correction factor k' to perform the control based on the correction factor map 220 obtained from the engine rotation speed Ne and the target rotation speed tNe. Then, the process advances to step S230. Otherwise, the process returns to step S221 without changing a setting of the pedal recovery correction factor k'.

In step S230, a target value Ne(t+1) of the immediately following a control cycle for the current engine rotation speed Ne is computed based on the target rotation speed Nt computed by the target rotation speed computing unit 110.

Specifically, the control target value computing unit 120 computes the control instruction value Ne(t+1) using the following equation (1) based on the engine rotation speed Ne obtained in step S210, that is, the engine rotation speed Ne(t) of the current timing t and the target rotation speed tNe.

$$Ne(t+1)=Ne(t)+k(tNe-Ne(t)), \quad (1)$$

where "k" denotes a correction factor.

In this manner, the control target value Ne(t+1) is computed. The control target value Ne(t+1) is a dynamic target value of the control necessary after a single control cycle (after "t+1") in order to allow the current engine rotation speed Ne(t) to follow the target rotation speed tNe. The controller 12 performs a control of the lock-up clutch 35 such that the engine rotation speed Ne follows this target value.

The correction factor k of this equation (1) denotes a correction factor of the control target value Ne(t+1) and is obtained by the correction factor map 220 as described below. When the difference between the engine rotation speed Ne(t) and the target rotation speed tNe is large, the correction factor k is controlled to increase in order to rapidly follow the target value. When the difference is small, the correction factor k is controlled to decrease in order to prevent overshooting from the target value.

Then, in step S240, the L/U torque computing unit 130 of the controller 12 computes the torque change amount $\Delta Tlu$, which is a change amount of the torque capacity of the lock-up clutch 35, corresponding to the control target value Ne(t+1) computed by the control target value computing unit 120.

Specifically, the L/U torque computing unit 130 computes the torque change amount $\Delta Tlu$ using the following equation (2) based on the engine rotation speed Ne (here, Ne(t)) obtained in step S210, the control target value Ne(t+1), and the control target value (Ne(t-1)) of the immediately preceding cycle.

$$\begin{aligned}\Delta Tlu &= Tlu(t+1) - Tlu(t) \\ &= -\tau(Ne(t+1)^\wedge 2 - Ne(t)^\wedge 2) - \\ &\quad I(Ne(t+1) - Ne(t)) - (Ne(t) - Ne(t-1))/\Delta t,\end{aligned} \quad (2)$$

where "$\tau$" denotes a coefficient of a fluid torque of the torque converter 30, and "I" denotes an inertia coefficient of a power train including the torque converter.

In this manner, the torque change amount $\Delta Tlu$ is obtained from the difference between the current torque capacity and the torque capacity corresponding to the control target value Ne(t+1).

The coefficients "$\tau$" and "I" are unique coefficients considering a power train and are stored in the controller 12 in advance. The coefficients "$\tau$" and "I" are values that change depending on rotation of the torque converter 30. However, they may be treated as equal values for a short time (t-1, t) or (t, t+1).

The controller 12 instructs the differential pressure of the lock-up clutch 35 to the hydraulic pressure control circuit 10 based on the torque change amount $\Delta Tlu$ computed in this manner in step S250. Specifically, a new differential pressure is computed by adding the torque change amount $\Delta Tlu$ to the differential pressure at the current instruction value to the lock-up clutch 35, and the new differential pressure is instructed to the hydraulic pressure control circuit 10.

Then, the controller 12 terminates the control (fourth phase) for dynamically changing the torque capacity of the lock-up clutch 35 based on the engine rotation speed Ne in this manner and determines whether or not the process advances to the fifth phase for engaging the lock-up clutch 35 in step S260.

In determination of step S260, termination of the fourth phase is determined when the vehicle speed VSP is equal to or higher than a predetermined value. Alternatively, the termination of the fourth phase may be determined when the difference between the target rotation speed tNe and the actual engine rotation speed Ne is smaller than a predetermined value.

In this manner, in the fourth phase, the torque capacity of the lock-up clutch 35 is controlled not to generate both a drop of the engine torque and an engine surge-up during a constant vehicle speed range and a transient period for increasing the engine rotation speed Ne.

Figure 7:
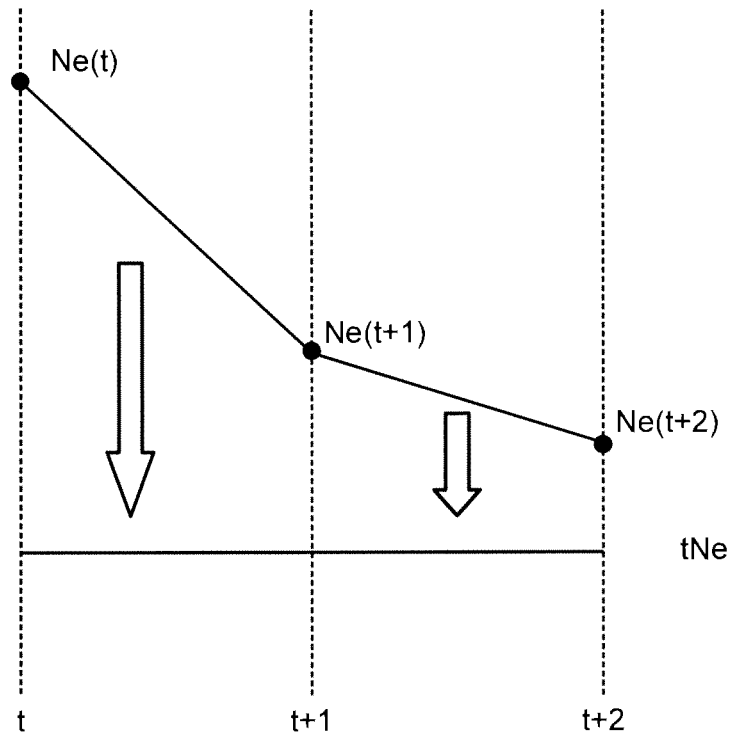
FIG. 7 is an explanatory diagram illustrating computation of a control target value performed by a control target value computing unit according to an embodiment of this disclosure.
Figure 8:
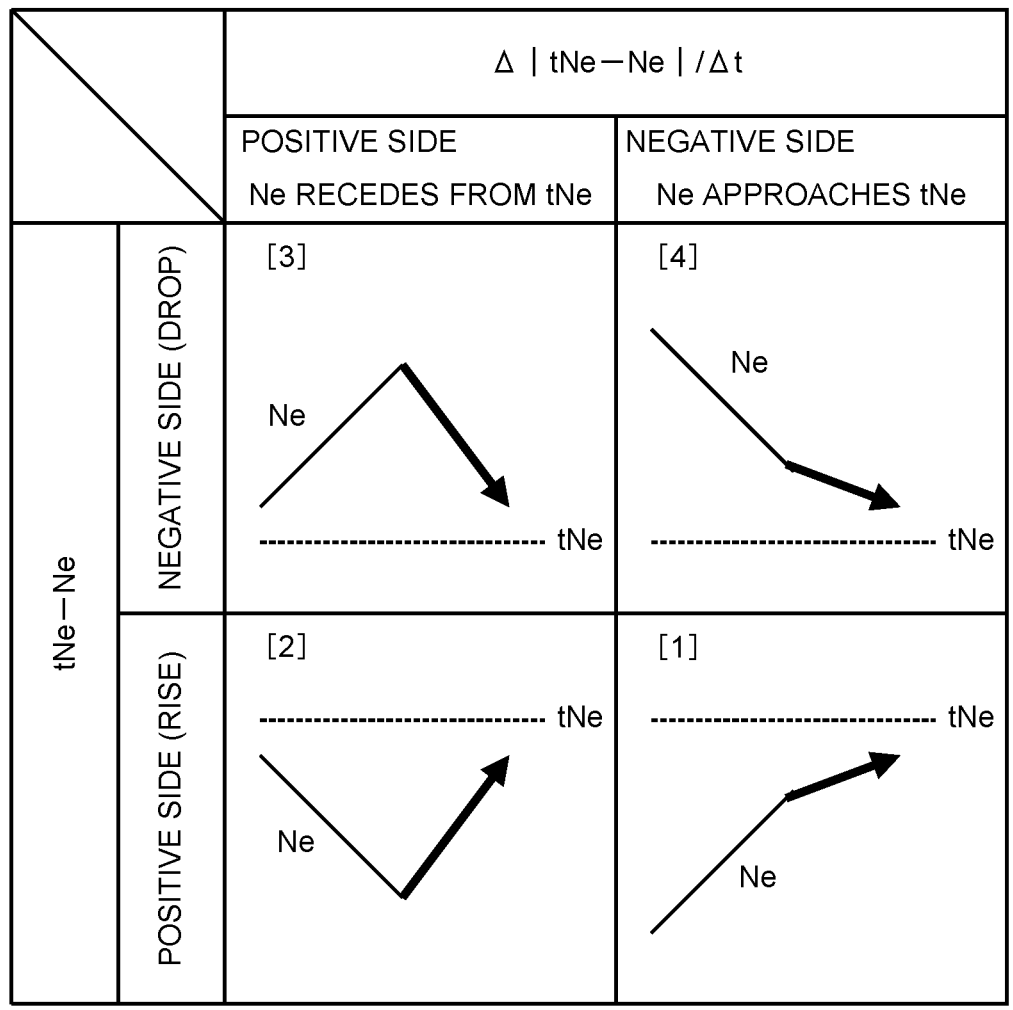
FIG. 8 is an explanatory diagram illustrating an exemplary correction factor map according to an embodiment of this disclosure.

FIGS. 7 and 8 are explanatory diagrams illustrating computation of the control target value Ne(t+1) performed by the control target value computing unit 120 according to an embodiment of this disclosure.

FIG. 7 illustrates the engine rotation speed Ne(t), the control target value Ne(t+1), the control target value Ne(t+2), and the target rotation speed tNe in three control cycles "t," "t+1," and "t+2."

In the control cycle "t," the control target value Ne(t+1) is determined using the aforementioned equation (1) based on the difference between the engine rotation speed Ne(t) and the target rotation speed tNe. In this case, the controller 12 determines the correction factor k by referencing the correction factor (k) map 220 illustrated in FIG. 8.

FIG. 8 is an explanatory diagram illustrating an exemplary correction factor map 220.

The correction factor k is determined by referencing the difference (tNe−Ne) between the engine rotation speed Ne(t) and the target rotation speed tNe and a map created based on a change rate of this difference ($\Delta |tNe-Ne|/\Delta t$).

Referring to FIG. 8, the ordinate expresses whether or not the difference has a negative value, that is, whether or not the engine rotation speed Ne is higher than the target rotation speed tNe (the engine rotation rises over the target value) or whether or not the difference has a positive value, that is, whether or not the engine rotation speed Ne is lower than the target rotation speed tNe (the engine rotation drops below the target value). In addition, the ordinate expresses whether or not the change rate of the difference has a positive value, that is, whether or not the engine rotation speed Ne recedes from the target rotation speed tNe or whether or not the change rate of the difference has a negative value, that is, whether or not the engine rotation speed Ne approaches the target rotation speed tNe.

In the correction factor map 220, for example, when the difference has a negative value, and the change rate of the difference has a positive value (Range 3), the actual engine rotation speed Ne rises over the target rotation speed tNe, and the actual engine rotation speed Ne changes to recede from the target rotation speed tNe. In this case, the correction factor k is set to a relatively large value such that the engine rotation speed Ne approaches the target rotation speed tNe.

When the difference has a negative value, and the change rate of the difference has a negative value (Range 4), the actual engine rotation speed Ne rises over the target rotation speed tNe, but the actual engine rotation speed Ne changes to approach the target rotation speed tNe. In this case, the correction factor k is set to a relatively small value in order to prevent the engine rotation speed Ne from excessively approaching the target rotation speed tNe.

When the difference has a positive value, and the change rate of the difference has a positive value (Range 2), the actual engine rotation speed Ne drops from the target rotation speed tNe, and the actual engine rotation speed Ne changes to recede from the target rotation speed tNe. In this case, the correction factor k is set to a relatively large value in order to make the engine rotation speed Ne approach the target rotation speed tNe.

When the difference has a negative value, and the change rate of the difference has a negative value (Range 1), the actual engine rotation speed Ne drops below the target rotation speed tNe, but the actual engine rotation speed Ne changes to approach the target rotation speed tNe. In this case, the correction factor k is set to a relatively small value in order to prevent the engine rotation speed Ne from excessively approaching the target rotation speed tNe.

By dynamically changing the correction factor k in this manner, it is possible to control the engine rotation speed Ne relative to the target rotation speed tNe when the throttle valve opening is equal to or smaller than a predetermined value, and the engine output power is approximately constant.

When the pedal recovery of the accelerator pedal is performed as in steps S221 and S222, the target rotation speed tNe set based on the accelerator pedal opening APO abruptly decreases due to the correction factor k. Accordingly, the engine rotation speed Ne is significantly fluctuated.

In order to prevent such a fluctuation, When the controller 12 determines that the accelerator pedal is recovered, the control is performed to compute the pedal recovery control target value Ne(t+1)' using the pedal recovery correction factor k' determined such that the current engine rotation speed Ne asymptotically approaches the control target value Ne(t+1).

Figure 9:
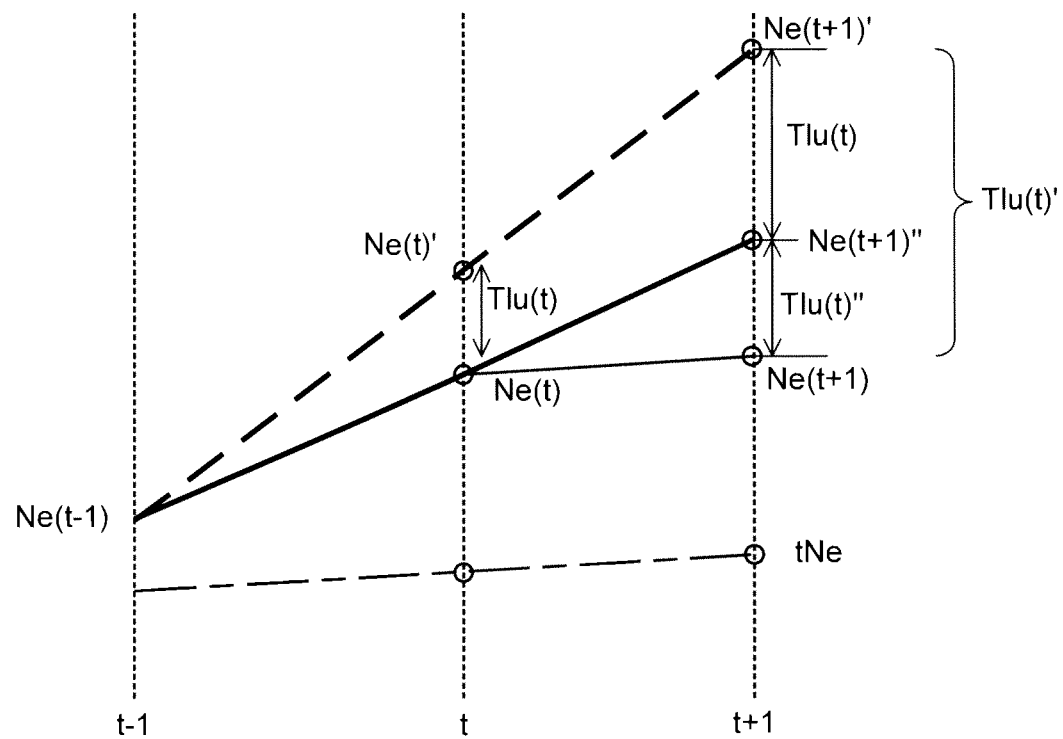
FIG. 9 is an explanatory diagram illustrating computation of a torque change amount performed by an L/U torque computing unit according to an embodiment of this disclosure.

FIG. 9 is an explanatory diagram illustrating computation of the torque change amount ΔTlu performed by the L/U torque computing unit 130 according to an embodiment of this disclosure.

FIG. 9 illustrates the engine rotation speed Ne and the target rotation speed tNe in three control cycles "t−1," "t," and "t+1" while the input torque is constant.

The locus indicated by the dotted line and the points Ne(t)' and Ne(t+1)' express the engine rotation speed in each control cycle when the torque Tlu(t) is not generated.

First, the L/U torque computing unit 123 computes the torque Tlu(t) necessary for the engine rotation speed Ne(t−1) at the timing t−1, in which the torque capacity Tlu(t) is not generated, to obtain the engine rotation speed Ne(t), which is an intermediate target value for making the engine rotation speed Ne(t)' asymptotically approach the target rotation speed tNe when the engine rotation speed Ne(t−1) changes to the engine rotation speed Ne(t)' in which the engine rotation speed torque capacity Tlu(t) at the timing t is not generated.

Then, at the timing t+1, a control target rotation speed Ne(t+1)" when the torque is set to the torque capacity Tlu(t) is obtained, and the torque Tlu(t+1)" necessary for the rotation speed Ne(t+1)" to become the control target value Ne(t+1) of the timing t+1 is estimated.

A torque Tlu(t+1), which is a sum of the torques Tlu(t) and Tlu(t+1)" of two states, is controlled as a control target value of the lock-up clutch 35 of the timing t+1.

In this manner, the torque Tlu(t+1), which is a sum of the torque Tlu(t) of the lock-up clutch 35 necessary to change from the engine rotation speed Ne(t−1) of the immediately preceding control cycle to the engine rotation speed Ne(t) of the current control cycle, the estimated lock-up clutch Tlu(t+1)' necessary to change from the current engine rotation speed Ne(t) to the control target value Ne(t+1) of the immediately following a control cycle, and the torque Tlu(t), is set to a control amount of the lock-up clutch 35 necessary for the control target value Ne(t+1) of the immediately following a control cycle.

Therefore, by controlling the lock-up clutch 35 to change the engagement force by this torque change amount ΔTlu(t+1), it is possible to control the engine rotation speed Ne(t) to the control target value Ne(t+1).

As described above, the embodiment of this disclosure is applied to a vehicle in which the output power of the engine 1 is output from the transmission 4 through the torque converter 30 having the lock-up clutch 35. The vehicle includes the hydraulic pressure control circuit 10 that controls the torque transmittable by the lock-up clutch by controlling the engagement force of the lock-up clutch 35 and the controller 12 that instructs the hydraulic pressure control circuit 10 to perform slip control for the lock-up clutch 35 during the vehicle start.

The controller 12 includes: a rotation speed obtaining unit that obtains the actual engine rotation speed Ne(t) from the engine 1; a target rotation speed computing unit that computes the target rotation speed tNe of the engine 1 in the slip control; a control target value computing unit that computes the control target value Ne(t+1) as a target value for controlling the rotation speed of the engine 1 to the target rotation speed tNe; and an instruction value computing unit that computes a change amount ΔTlu(t+1) as an instruction value to the lock-up clutch 35 necessary to control the rotation speed of the engine 1 to the control target value Ne(t+1).

According to an embodiment of this disclosure, using such a configuration, it is possible to perform control such that the engine rotation speed Ne follows the target rotation speed tNe by controlling the torque capacity transmitted by the lock-up clutch 35 based on the engine rotation speed Ne without using the torque signal of the engine 1. Therefore, since an engine torque signal of the engine 1 is not used, it is possible to prevent a driver's uncomfortable feeling caused by a shock in an engine driving system due to hunting in a control of the torque capacity of the lock-up clutch 35 when a delay of the control is generated in a feedforward control or a feedback control. This advantage is included in effects of claims 1 and 6.

The controller 12 is configured as a vehicle speed detection unit that detects the vehicle speed VSP using the vehicle speed sensor 43. The controller 12 is configured as an accelerator pedal opening detection unit that detects the accelerator pedal opening APO using the accelerator opening sensor 41. The controller 12 determines the target rotation speed tNe by referencing a map created based on the vehicle speed VSP and the accelerator pedal opening APO when the accelerator pedal opening APO is equal to or lower than a predetermined value. As a result, it is possible to easily compute the target rotation speed tNe and prevent a delay of the control. Therefore, it is possible to prevent a driver's uncomfortable feeling caused by a shock in an engine driving system due to hunting in a control of the torque capacity of the lock-up clutch 35 when a delay of the control is generated. This advantage is included in effects of claim 2.

The controller 12 computes the control target value Ne(t+1) by adding or subtracting a value obtained by multiplying a predetermined correction factor k by the difference (Ne(t)−tNe) between the actual engine rotation speed Ne(t) and the target rotation speed tNe to or from the actual engine rotation speed Ne(t). Through this control, it is possible to perform control such that the control target value Ne(t+1) that determines what kind of a response is used to change the current actual engine rotation speed Ne(t) to the target rotation speed tNe can change using the correction factor k. This advantage is included in effects of claim 3.

The controller 12 computes the correction factor k based on at least one of the difference (tNe−Ne(t)) between the actual engine rotation speed and the target rotation speed and a change amount (Δ|tNe−Ne(t)|) of the difference between the actual engine rotation speed and the target rotation speed. Through this control, it is possible to control what kind of response is used to change the current actual engine rotation speed Ne(t) to the target rotation speed tNe by changing the correction factor k. Therefore, it is possible to allow the engine rotation speed Ne to follow the target rotation speed tNe rapidly without generating overshooting. This advantage is included in effects of claim 4. In addition, the controller 12 computes the correction factor k based on the actual engine rotation speed Ne(t) when the accelerator pedal opening APO is reduced by a predetermined value or larger. As a result, when the accelerator pedal is returned, the target rotation speed tNe changes, and it is possible to prevent overshooting in the control by setting the correction factor k to follow the changed target value. This advantage is included in effects of claim 5.

The controller 12 computes the change amount ΔTlu(t+1) of the engagement force of the lock-up clutch 35 corresponding to the control target value Ne(t+1) based on a change amount of the fluid torque T of the torque converter 30 corresponding to the actual engine rotation speed and a change amount of the inertia torque I of the torque converter 30. Through this control, it is possible to compute a change amount of the torque capacity of the lock-up clutch 35 for changing the actual engine rotation speed Ne(t) to the control target value Ne(t+1). This advantage is included in effects of claims 6.

Although various embodiments of this disclosure have been described hereinbefore, they are just for illustrative purposes and are not intended to specifically limit the technical scope of the invention. Instead, it would be appreciated that that various changes or modifications may be possible without departing from the spirit and scope of the invention.

For example, the transmission 4 may be a stepped variable transmission or a continuously variable transmission in which a V-belt or a chain is stretched between a pair of pulleys. Alternatively, a toroidal continuously variable transmission in which a power roller that can be rolled with an inclination is arranged between input and output disks may also be employed.

In the embodiment described above, a torque capacity of the lock-up clutch 35 of the torque converter 30 is controlled based on a differential pressure between an applied pressure Pa and a release pressure Pr. However, the invention is not limited thereto. Alternatively, the lock-up clutch may be a multi-disk clutch. In this case, a second standby pressure may be set as a pre-charge pressure of the multi-disk clutch control.

Although a control is performed based on the accelerator pedal opening APO in the embodiment described above, the invention is not limited thereto. Alternatively, a control may be performed based on the throttle valve opening TVO.

This application claims priority to Japanese Patent Application Laid-open No. 2012-97799 filed with Japan Patent Office on Apr. 23, 2012, the entire contents of which are incorporated herein by reference.

Exclusive nature or features of the embodiments of this invention are claimed as follows.

The invention claimed is:

1. A device for controlling a start of a vehicle in which an output of an engine is output from a transmission via a torque converter having a lock-up clutch, the device comprising:
    a start request detection unit adapted to detect a start request for the vehicle;
    a hydraulic pressure control circuit adapted to control a torque transmittable by the lock-up clutch by controlling an engagement force of the lock-up clutch in response to the start request for the vehicle; and
    a control unit adapted to instruct the hydraulic pressure control circuit to perform a slip control for the lock-up clutch during a vehicle start,
    wherein the control unit has
        a rotation speed obtaining unit adapted to obtain an engine rotation speed of the engine at a current timing,
        a target rotation speed computing unit adapted to compute a target rotation speed of the engine in the slip control at a current timing,
        a control target value computing unit adapted to compute a control target value, which is a target value necessary in an immediately following control cycle to control the engine rotation speed to the target rotation speed based on the engine rotation speed and the target rotation speed at a predetermined control cycle ((t−1), t, (t+1)), and
        an instruction value computing unit adapted to compute an instruction value for an engagement force of the lock-up clutch necessary to control the engine rotation speed to the control target value in the immediately following control cycle,
    wherein the instruction value computing unit computes the instruction value for the engagement force of the lock-up clutch based on the engine rotation speed at a current time (t) and the control target value of the immediately following control cycle (t+1).

2. The vehicle start control device according to claim 1, further comprising:
    a vehicle speed detection unit adapted to detect a vehicle speed of the vehicle; and
    an accelerator pedal opening detection unit adapted to detect an accelerator pedal opening of the engine,
    wherein the target rotation speed computing unit computes the target rotation speed based on the vehicle speed and the accelerator pedal opening when the accelerator pedal opening is equal to or lower than a predetermined value.

3. The vehicle start control device according to claim 1, wherein the control target value computing unit computes the control target value by adding or subtracting a value obtained by multiplying a predetermined factor by a difference between the engine rotation speed and the target rotation speed to or from the engine rotation speed.

4. The vehicle start control device according to claim 3, wherein the control target value computing unit computes the factor based on at least one of a difference between the engine rotation speed and the target rotation speed or a change amount of the difference between the engine rotation speed and the target rotation speed.

5. The vehicle start control device according to claim 3, further comprising an accelerator pedal opening detection unit adapted to detect an accelerator pedal opening of the engine, wherein the control target value computing unit computes the factor based on the engine rotation speed when the accelerator pedal opening is reduced by a predetermined value or larger.

6. The vehicle start control device according to claim 1, wherein the instruction value computing unit computes an engagement force of the lock-up clutch corresponding to the control target value based on a fluid torque change amount of the torque converter corresponding to the engine rotation speed and an inertia torque change amount of the torque converter.

7. A method for controlling a start of a vehicle in which an output of an engine is output from a transmission via a torque converter having a lock-up clutch, the method comprising:
 a first process of obtaining an engine rotation speed of the engine at a current timing;
 a second process of computing a target rotation speed of the engine at a current timing when a slip control is performed for the torque converter;
 a third process of computing a control target value which is a target value necessary in an immediately following control cycle to control the engine rotation speed to the target rotation speed based on the engine rotation speed and the target rotation speed at a predetermined control cycle ((t−1), t, (t+1));
 a fourth process of computing an instruction value to the lock-up clutch necessary to control the engine rotation speed to the control target value of the immediately following control cycle based on the engine rotation speed at a current time (t) and the control target value of the immediately following control cycle (t+1);
 a fifth process of controlling a torque transmittable by the lock-up clutch by controlling an engagement force of the lock-up clutch based on the instruction torque; and
 a sixth process of repeating the first to fifth processes.

8. A device for controlling a start of a vehicle in which an output of an engine is output from a transmission via a torque converter having a lock-up clutch, the device comprising:
 a start request detection means adapted to detect a start request for the vehicle;
 a hydraulic pressure control circuit means adapted to control a torque transmittable by the lock-up clutch by controlling an engagement force of the lock-up clutch in response to the start request for the vehicle; and
 a control means adapted to instruct the hydraulic pressure control circuit means to perform a slip control for the lock-up clutch during a vehicle start,
 wherein the control means has
 a rotation speed obtaining means adapted to obtain an engine rotation speed of the engine at a current timing,
 a target rotation speed computing means adapted to compute a target rotation speed of the engine in the slip control at a current timing,
 a control target value computing means adapted to compute a control target value, which is a target value necessary in an immediately following control cycle to control the engine rotation speed to the target rotation speed based on the engine rotation speed and the target rotation speed at a predetermined control cycle ((t−1), t, (t+1)), and
 an instruction value computing means adapted to compute an instruction value for an engagement force of the lock-up clutch necessary to control the engine rotation speed to the control target value in the immediately following control cycle,
 wherein the instruction value computing means computes the instruction value for the engagement force of the lock-up clutch based on the engine rotation speed at a current time (t) and the control target value of the immediately following control cycle (t+1).

* * * * *